United States Patent Office 3,458,824
Patented July 29, 1969

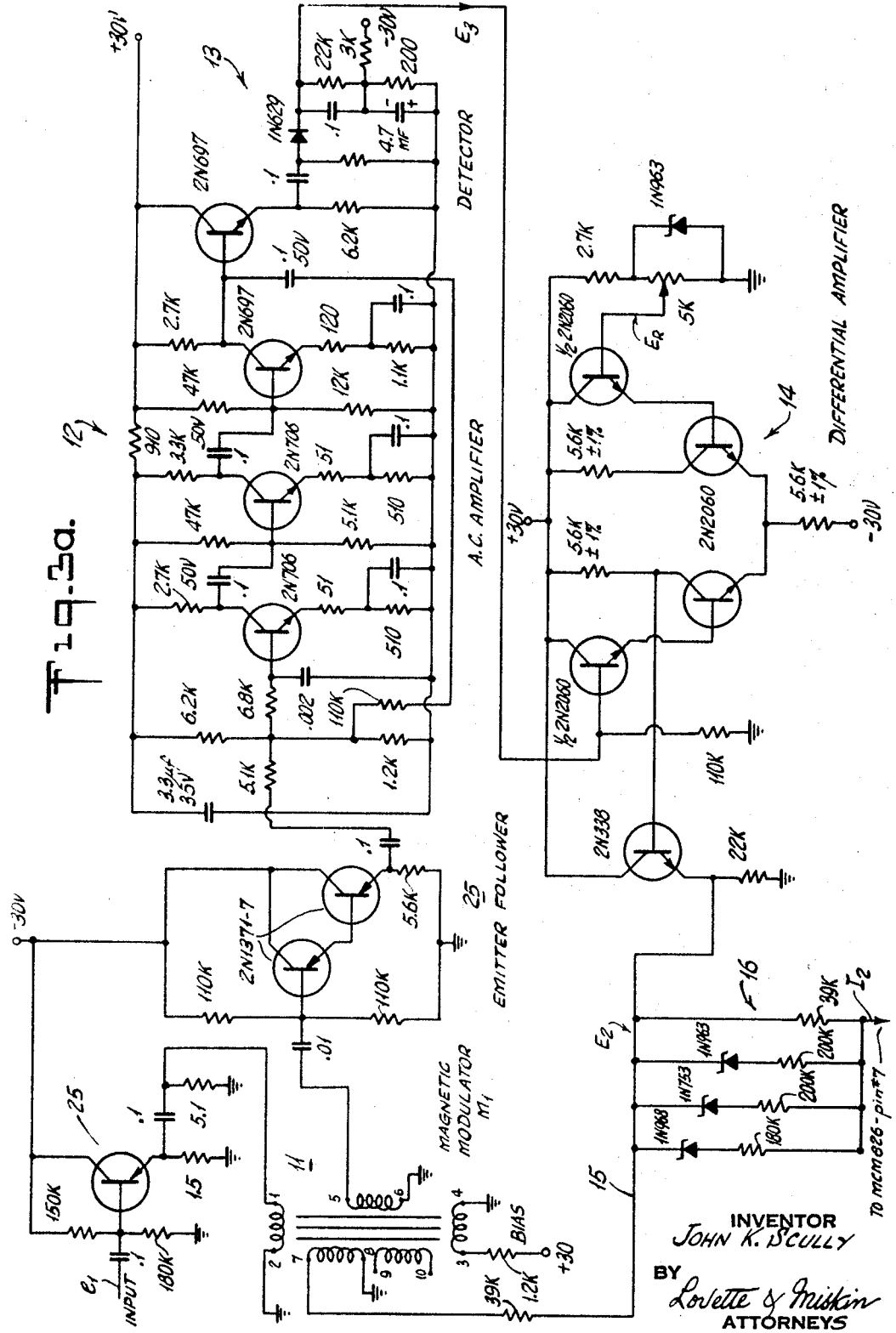

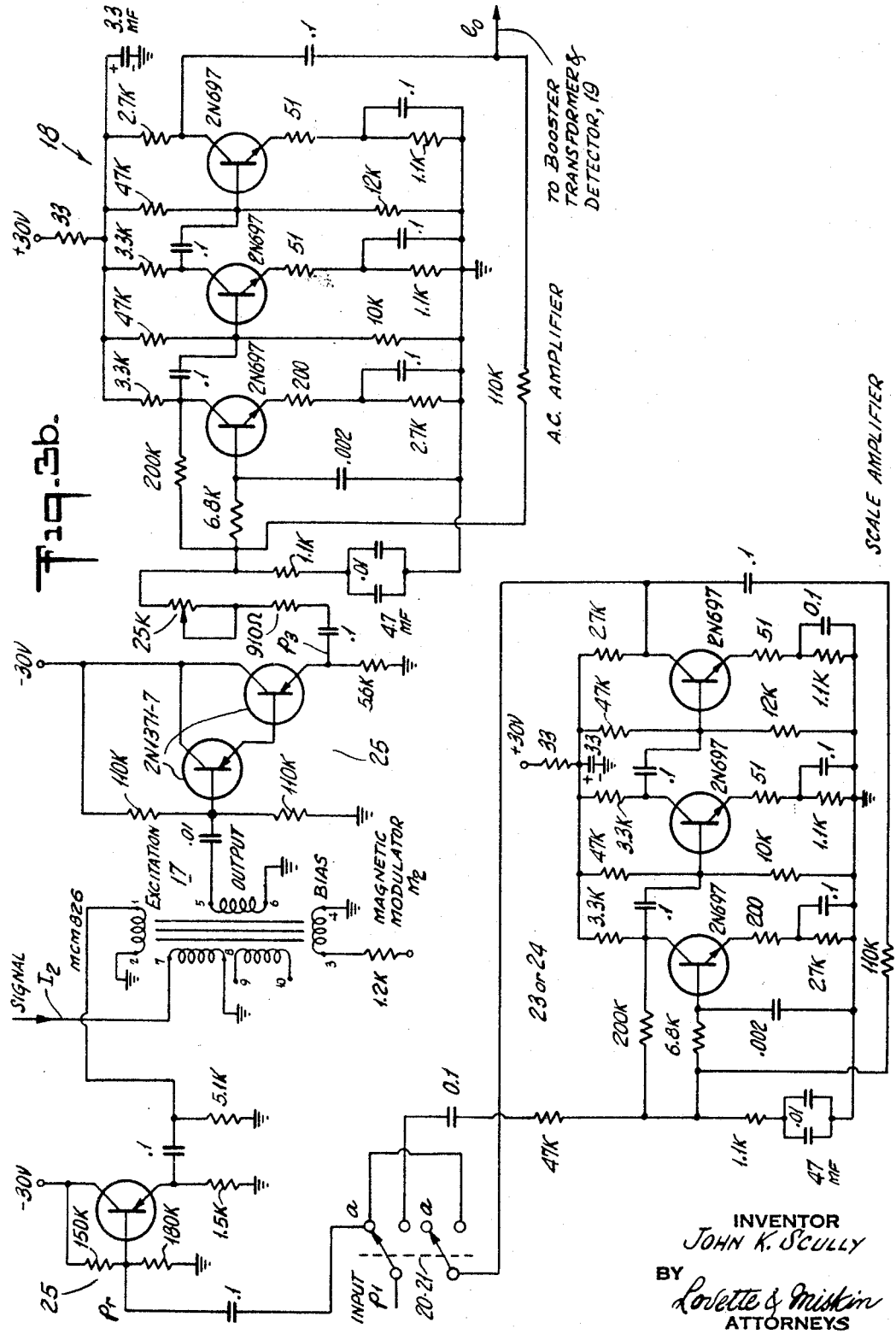

3,458,824
WIDEBAND RATIOMETER
John K. Scully, Syosset, N.Y., assignor to PRD Electronics, Inc., Westbury, N.Y., a corporation of New York
Continuation of application Ser. No. 455,720, May 14, 1965. This application July 12, 1965, Ser. No. 471,277
Int. Cl. G06g 7/16; H03k 5/20
U.S. Cl. 328—161          4 Claims

ABSTRACT OF THE DISCLOSURE

A network for determining the ratio of AC analog voltages including first and second circuits having first and second analog inputs. The first circuit produces a voltage which is inversely proportional to the first analog voltage, and the second circuit produces an output voltage which is proportional to the ratio of the analog voltages. This is accomplished by making the second circuit responsive to the inverse signal from the first circuit.

---

This is a continuing application of Ser. No. 455,720, filed May 14, 1965, and now abandoned, entitled, "Wideband Ratiometer," in the name of John K. Scully."

The instant invention deals with the ratio measurement of varying AC voltages. In particular, it deals with means for sensing rapidly varying AC analog voltages to provide an accurate voltage analog of their instantaneous ratio.

When measuring R-F signals, it is often necessary to obtain the ratio of two such signals. A common situation requires determination of the ratio of reflected power to incident power. The incident power along a linear sweep frequency would desirously be a constant value. Due to the microwave system employed, a ripple is actually produced as the incident power. If perfect reflection occurs, the reflected power ripple would be the same as the incident power. However, the reflected power actually has a further erratic ripple wave. It is frequently desirous to display the ratio of these powers on a cathode ray tube (CRT.) Since rapid variation in both these levels must be accommodated during the frequency sweep, the bandwidth of the ratio instrument is of fundamental importance. Many devices in prior art have a very high accuracy in such ratio measurements. However, bandwidth limitations render them entirely unsatisfactory for use with a CRT display. In order to keep the scope steady, it is necessary to have a very rapid reading ratio instrument, i.e., a wideband ratiometer.

It is the object of the instant invention to provide ratiometer means with both inherent accuracy and wide bandwidth.

It is a further object to provide an automatic ratio instrument for use in measuring AC analog signals.

Further objects and advantages will become apparent from the following description of the invention taken in conjunction with the figures, in which:

FIGS. 3a and 3b provide a schematic illustration of a ratiometer in accordance with the invention.

A ratiometer 10 in accordance with the invention consists of a closed loop circuit $\alpha$ and an output circuit $\beta$. First and second AC analog signals $e_1$ and $p_1$ are fed to the respective circuits. For descriptive purposes, device 10 will be explained using incident power and reflected power as the first and second signals, respectively. The loop circuit $\alpha$ uses type O feedback. This loop is designed to provide a DC voltage $E_2$ inversely proportional to the incident power $e_1$. DC voltage $E_2$ together with reflected power $p_1$ is fed into the second circuit. The second circuit is designed to produce an output voltage $E_o$ directly proportional to the reflected power and inversely proportional to the incident power. The output voltage is therefore a function of the ratio of reflected power to incident power.

Figure 1:
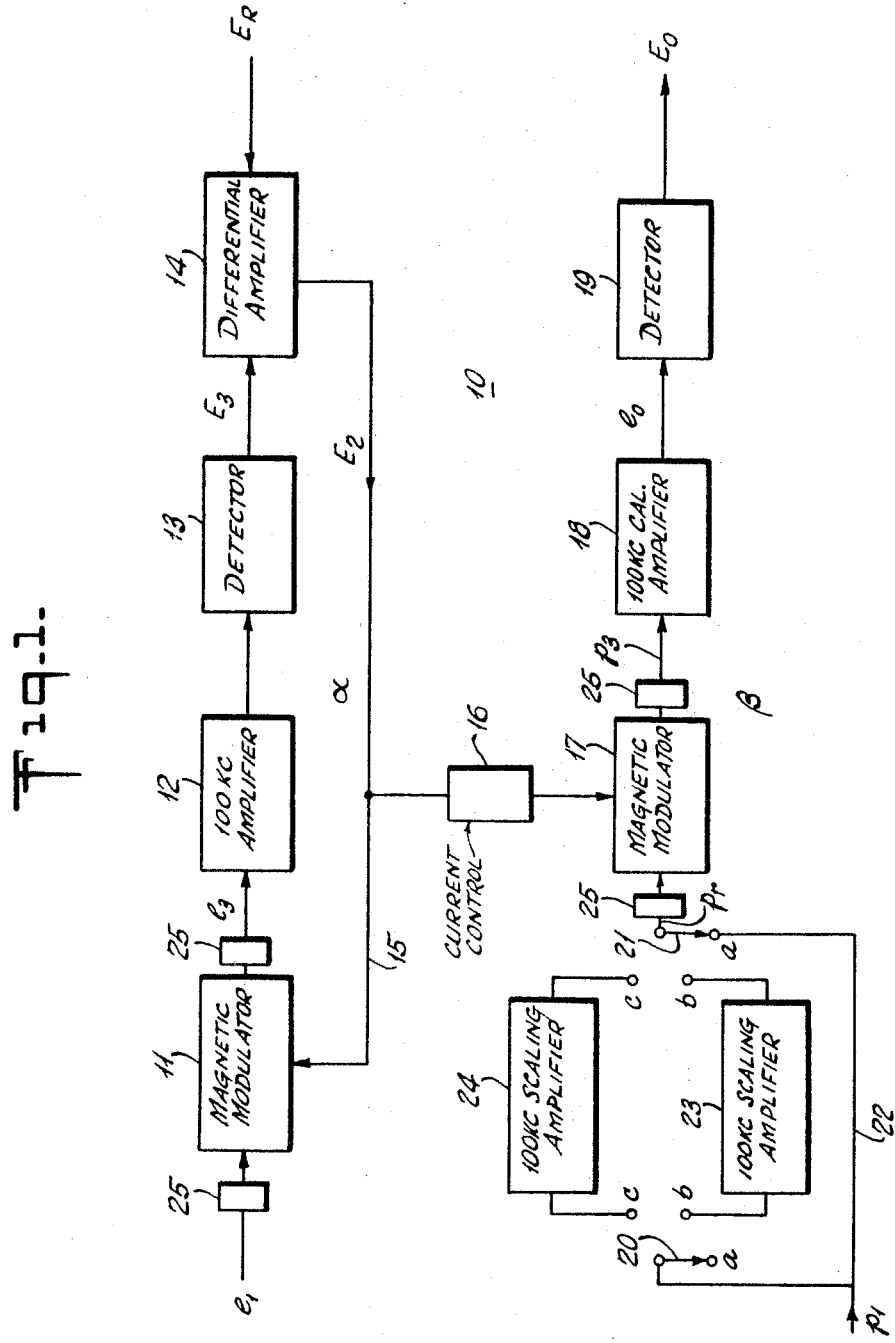
FIG. 1 is a block diagram of a ratiometer incorporating the principles of the instant invention.

With reference to FIG. 1, ratiometer 10 is made up of closed loop $\alpha$ and open loop $\beta$. Incident power $e_1$, an AC analog voltage, is fed to a magnetic modulator 11 of loop $\alpha$. All input voltages are at 100 kc., wherein the amplitudes thereof are proportional to the respective values of power. Most R-F systems work with a 30 kc. signal which is boosted to 100 kc. for the system contemplated herein. The output $e_3$ for magnetic modulator 11 is fed into a 100 kc. amplifier 12 of the conventional operational type used in conjunction with a diode peak detector 13. Detector 13 converts the AC signal to a DC value $E_3$. The DC voltage $E_3$ is proportional to the AC signal $e_3$ at the output of magnetic modulator 11. A differential amplifier 14 receives signals $E_3$ as one of its inputs. A constant DC reference voltage $E_R$ is the second input fed to amplifier 14. Amplifier 14 is a standard single stage type. The output of differential amplifier 14 is DC voltage $E_2$. Voltage $E_2$ is fed back to magnetic modulator 11 through lead 15. Voltage $E_2$ is also used as a control voltage for circuit $\beta$. A current control system 16 consists of groups of parallel resistors designed to provide a "corrected" signal current $I_2$ to circuit $\beta$. Signal $I_2$ is proportional to $E_2$ and enters loop $\beta$ as a DC input to a magnetic modulator 17. Emitter followers 25 precede and follow both magnetic modulators 11, 17. The emitter followers 25 are conventional Darlington circuits with input impedances of 50K ohms. The reflected power AC analog voltage $p_r$ is the second input to magnetic modulator 17. An output voltage $p_3$ is fed to a 100 kc. calibration amplifier 18 for proper scaling to a specific height. The output voltage from amplifier 18 may be stepped up, rectified and filtered to provide a CRT beam deflection. FIG. 1 depicts a detector 19 for boosting and rectifying the AC signal to provide the output DC voltage $E_o$.

The illustrated embodiment provides three ranges of reflected power input in order to obtain full scale deflections. Switches 20 and 21 are ganged to close respective contact switch positions $a$, $b$ or $c$. When in position $a$, the reflected power $p_1$ flows over lead 22 into the ratiometer system. Two input gain scaling amplifiers 23 and 24 provide different values of gain to boost the input reflected power $p_1$. When switches 20 and 21 are on respective contacts $b$, reflected power $p_1$ is sent through amplifier 23 before being fed into modulator 17. When position $c$ is used, the signal is fed through amplifier 24.

In loop $\alpha$, magnetic modulator 11 produces a voltage $e_3$ which is directly proportional to the product of the AC and DC inputs, $e_1$ and $E_2$. Detector 13 converts $e_3$ to DC voltage $E_3$, both of which are directly proportional to each other. Differential amplifier 14 is balanced by two input voltages $E_3$ and $E_R$ and produces the DC output voltage $E_2$. As $e_1$ increases, $e_3$ and $E_3$ increase. Since $E_R$ is constant, as $E_3$ increases, differential amplifier 14 becomes unbalanced and $E_2$ is forced to decrease. Because of the feedback, $E_2$ re-enters loop $\alpha$ and decreases the $e_1$ and $E_2$ product until the value of $e_3$ returns to the value it had before the increase occurred to $e_1$. This action causes $e_1$ and $E_2$ to bear an approximate reciprocal relationship to one another, i.e., if $e_1$ doubles, $E_2$ must be halved in order to maintain $e_3$ constant.

DC voltages $E_2$ together with the reflected voltage $p_r$ serve as the input to magnetic modulator 17. The AC output $p_3$ is directly proportional to the product of inputs $E_2$ and $p_r$. The output voltage $E_o$ is a DC form of $p_3$, hence voltage $E_o$ is proportional to the product of $E_2$ and $p_r$. This is actually the ratio of $p_r/e_1$, or reflected power to incident power. Since this ratio does not depend upon time division or servo technique, it is capable of varying rapidly and producing an instaneous ratio of signals.

Figure 2:
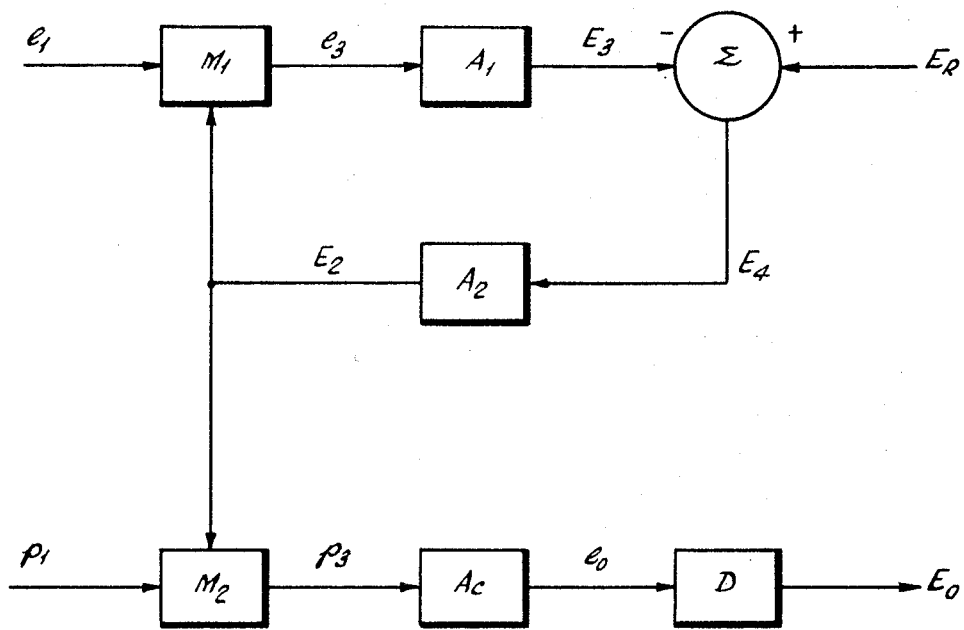
FIG. 2 is a functional block diagram thereof for indicating the ratiometer as contemplated in the instant invention.

A fuller mathematical explanation is shown in conjunction with FIG. 2, which is a functional block diagram of the ratiometer circuitry. The 100 kc. and differential amplifier gains of loop $\alpha$ are given by $A_1$ and $A_2$, respectively. The modulator product constants are $M_1$ and $M_2$ and are identical. $A_c$ is the gain of the calibration amplifier and $D$ is the effective gain of the output amplifier-rectifier-filter combined in circuit $\beta$.

The magnetic modulator constants are:

$$M_1 = M_2 = \frac{e_3}{e_1 E_2} = \frac{p_3}{p_1 E_2} \quad (1)$$

From FIG. 2, one may establish $E_4$ and $E_3$ as follows:

$$E_4 = E_R - E_3$$
$$E_3 = A_2 E_4 M_1 e_1 A_1$$
$$E_4 = E_R - A_1 A_2 e_1 M_1 E_4$$

therefore $$E_4 = \frac{E_R}{1 + A_1 A_2 e_1 M_1}$$

The reciprocal generator is a type O control loop with error signal $E_2$ given by:

$$E_2 = A_2 E_4 = \frac{A_2 E_R}{1 + A_1 A_2 M_1 e_1} \quad (2)$$

where the term $M_1 e_1$ merely assumes the role of an ordinary gain factor. However, Equation 2 may be rewritten as:

$$E_2 = \frac{E_R}{A_1 M_1} \left[ \frac{1}{\frac{1}{A_1 A_2 M_1} + e_1} \right]$$

$$\frac{E_R}{A_1 M_1} \left[ \frac{1}{e_1} - \frac{1}{A_1 A_2 M_1} \frac{1}{e_1^2} + \cdots \right]$$

$$\frac{E_R}{A_1 M_1} \cdot \frac{1}{e_1} \left[ 1 - \frac{1}{A_1 A_2 M_1 e_1} + \cdots \right] \quad (3)$$

Thus, $E_2$ is proportional to the reciprocal of $e_1$ if $E_R$ is held as a constant reference. The deviation or error in this relationship is given by $$\frac{1}{A_1 A_2 M_1 e_1}$$

and can be held to a minimum by choosing suitably large values of $A_1$ and $A_2$.

Equation 3 indicates that as $e_1$ increases, $E_2$ tends to decrease somewhat more slowly than it should for an ideal reciprocal relationship. Although this error is reduced by choosing relatively large values of $A_1$ and $A_2$, some residual error necessarily remains in the loop. Compensation for this residual error is provided at the $E_2$ input of modulator $M_2$. Current control means 16 includes a series of Zener diodes with varying breakpoints. These Zeners effectively correct $E_2$, whereby $E_2$ more closely approximates the true reciprocal of $e_1$ by switching parallel resistors at the input of $M_2$. This almost eliminates the residual error.

In its corrected form, Equation 3 may now be written as:

$$E_2 = K_1 \frac{1}{e_1} \quad (4)$$

where $$K_1 = \frac{E_R}{A_1 M_1}$$

The scaled analog of reflector power $p_1$ is applied to $M_2$ and multiplied by $E_2$, such that the AC output $p_3$ is given by:

$$p_3 = p_1 E_2 M_2 \text{ from Equation 1}$$

$$\text{and} = p_1 \frac{K_1}{e_1} M_2 \text{ from equation 4}$$

thus $$p_3 = K_2 \frac{p_1}{e_1} \quad (5)$$

where $$K_2 = \frac{E_R M_2}{A_1 M_1}$$

or $$p_3 = K_2 \left( \frac{\text{reflected power}}{\text{incident power}} \right) \quad (6)$$

The deflecting voltage $E_o$ is given by:

$$E_o = K_2 A_c D \frac{p_1}{e_1}$$

or $$E_o = K_3 r$$

where $$K_3 = \frac{E_R M_2 A_c D}{A_1 M_1} \text{ and } r = \frac{p_1}{e_1} \quad (7)$$

Equation 7 shows that voltage $E_o$ is independent of proportional changes in $p_1$ and $e_1$, and varies only as the instantaneous ratio $r$.

Although the invention had been described using incident and reflected power, it will be understood that the invention can be used to provide a ratio of any two AC analog voltages. Because of the speed and accuracy with which the ratiometer can operate, it is well adapted as a VSWR measuring device where both incident and reflected power vary rapidly as a frequency band is swept. Those skilled in the art can readily use it for dynamic analyzers for calculation of gain ratios or for use in a carrier type control system.

The illustrated embodiment provides measurement over three VSWR ranges. The relationship among them is as follows:

| Range | Ratio (r) | Required gain |
|---|---|---|
| 1.0–1.5 | 1/5 | 6/10÷1/5=3.0 |
| 1.0–2.5 | 3/7 | 6/10÷3/7=1.4 |
| 1.0–4.0 | 6/10 | 1.0 |

Essentially, the three ranges are normalized against the 1.0–4.0 VSWR range. Gains required for the lower ranges are provided by respective scaling amplifiers 23, 24 in order to provide full scale deflection on the CRT to correspond to a VSWR of 1.5, 2.5 or 4.0.

FIGS. 3a and 3b show a schematic of a ratiometer 10 in accordance with the invention substantially as set forth in the block diagrams of FIGS. 1 and 2. As a matter of fact, it will be noted that the individual block diagram components identified in FIG. 1 are identified in FIGS. 3a and 3b by the same reference numbers. All the values of capacitors are microfarads unless noted otherwise. For purpose of simplification, FIG. 3b illustrates only one scaling amplifier 23 or 24 for the purpose of providing sufficient gain to provide a full scale deflection at the lower ranges of VSWR. Moreover, the output in FIG. 3b is brought up to the AC output $e_0$. Actually, what follows therafter will depend upon the individual circumstances to which the analog ratio is put. For example, $e_0$ may be fed into a booster transformer and to a detector 19 of known design for providing a corresponding proportional DC output $E_0$.

It is intended that all matter contained in the above description or shown in the accompanying drawings shall be interpreted as illustrative and not in a limiting sense.

What is claimed is:

1. Ratiometer means for ascertaining a ratio of AC analog voltages comprising:

first circuit means responsive to a first AC analog voltage and including a feedback loop for providing a feedback voltage inversely proportional to said first analog voltage, said first circuit means having first modulator means, amplifier-detector means and differential summation means coupled to form said circuit feedback loop; said first analog voltage and said inverse feedback voltage being coupled as inputs to said modulator means for completing said loop circuit, means for applying a substantially constant unilateral reference voltage to said differential summation means for forming said feedback voltage, second circuit means responsive to a second AC analog voltage and responsive to said feedback voltage for producing an output voltage proportional to the ratio of said analog voltages, and current control means for coupling said inverse feedback voltage to said second circuit means, said second circuit means having second modulator means and signal amplifier and output means for providing said output voltage, said modulators having matched gain constants, said first and second circuits having selected gain constants.

2. Means as defined in claim 1, wherein said current control means including means for effecting a rate of change of said feedback voltage coupled to said second circuit to approximate more closely the rate of change of the inverse of said first analog voltage.

3. Ratiometer means for determining the ratio of two AC analog voltages comprising:

a first circuit including first modulator means, amplifier means having an output, detector means, differential voltage summation means coupled to define a feedback loop circuit for providing a DC feedback voltage inversely proportional to a first of the AC analog voltages;

said DC feedback voltage and said first analog voltage being coupled as inputs to said modulator means, a constant DC reference voltage coupled to said differential voltage summation means for forming said feedback signal, said reference voltage and the output of said amplifier means serving as inputs to said differential summation means; and a circuit including second modulator means in combination with second amplifier-detector means, current control means for coupling said feedback signal to said second modulator means, said amplifier-detector and said current control means having respective outputs, a second of the AC analog voltages and the output of said current control means being coupled as inputs to said second modulator means, whereby the output of said amplifier-detector is proportional to the ratio of said analog voltages.

4. A ratiometer as defined in claim 5 further including, a plurality of means for scaling said second analog voltage as an input to said second circuit.

References Cited

UNITED STATES PATENTS

| | | | |
|---|---|---|---|
| 2,845,528 | 7/1958 | Brook | 328—161 XR |
| 2,860,241 | 11/1958 | Post | 328—146 XR |
| 3,020,529 | 2/1962 | Turner | 324—58 XR |

FOREIGN PATENTS 886,656   1/1962   Great Britain.

JOHN S. HEYMAN, Primary Examiner

S. T. KRAWCZEWICZ, Assistant Examiner

U.S. Cl. X.R.

307—235; 324—140; 328—146, 150; 329—129